(12) United States Patent
Yang et al.

(10) Patent No.: US 7,809,014 B2
(45) Date of Patent: Oct. 5, 2010

(54) AAL0 CELL FORMAT OF AN ATM PROTOCOL FOR COMMUNICATING VOICE TRAFFIC IN A CDMA SYSTEM

(76) Inventors: Woo Young Yang, Hanmaeum Imgwang Apt. 106-704, Hogye 2-dong, Dongan-gu, Anyang-si, Gyeonggi-do 431-752 (KR); Moon Seok Baek, Imgwang Apt. 301-1503, Pungdeokcheon 2-dong, Suji-gu, Yongin-si, Gyeonggi-do 448-989 (KR)

( * ) Notice: Subject to any disclaimer, the term of this patent is extended or adjusted under 35 U.S.C. 154(b) by 787 days.

(21) Appl. No.: 10/556,206

(22) PCT Filed: Jun. 2, 2004

(86) PCT No.: PCT/KR2004/001311
§ 371 (c)(1),
(2), (4) Date: Mar. 29, 2007

(87) PCT Pub. No.: WO2004/107666
PCT Pub. Date: Dec. 9, 2004

(65) Prior Publication Data
US 2007/0183429 A1    Aug. 9, 2007

(30) Foreign Application Priority Data
Jun. 2, 2003    (KR) .................... 10-2003-0035286

(51) Int. Cl.
*H04J 3/16*    (2006.01)
*H04J 3/22*    (2006.01)

(52) U.S. Cl. .................... 370/466; 370/467; 370/469; 370/310.1

(58) Field of Classification Search ............ 370/310.1, 370/466, 469, 467, 401, 310, 315, 353, 358, 370/360, 395, 400, 468, 535, 395.6, 395.61, 370/310.2
See application file for complete search history.

(56) References Cited

U.S. PATENT DOCUMENTS

| 5,878,045 | A  | * | 3/1999 | Timbs ........................ 370/466 |
| 6,018,525 | A  | * | 1/2000 | Sucharczuk ................. 370/394 |
| 6,456,631 | B1 | * | 9/2002 | Nomura ...................... 370/466 |
| 7,088,723 | B2 |   | 8/2006 | Yang |
| 7,245,591 | B2 | * | 7/2007 | Jeong ....................... 370/310.1 |

FOREIGN PATENT DOCUMENTS

| KR | 2001-2240 | 1/2001 |
| KR | 2003-59394 | 7/2003 |
| WO | 97/38513 | 10/1997 |
| WO | 99/33314 | 7/1999 |
| WO | 01/26293 | 4/2001 |
| WO | 2004/107666 | 12/2004 |

OTHER PUBLICATIONS

Transport of VBR MPEG-2 Traffic in ATM Networks, Wan Zhong, Luan Guixing, 2001.*
WO 2004/107666 A1, International Publication Date: Dec. 9, 2004.*

* cited by examiner

*Primary Examiner*—Ayaz R Sheikh
*Assistant Examiner*—Chuong T Ho
(74) *Attorney, Agent, or Firm*—McDonnell Boehnen Hulbert & Berghoff LLP

(57) ABSTRACT

Disclosed herein are devices and methods for communicating full-rate voice data under an ATM protocol. An exemplary device is configured to communicate voice data through a vocoder in a CDMA backbone network using an ATM Adaptation Layer 0 (AAL0) cell-generating system, which is configured to generate an AAL0 cell for each frame of full-rate voice data. In an exemplary embodiment, the device generates AAL0 cells that each comprise (a) 5 bytes of a Header field; (b) 1 byte of a Length field indicating a size of the voice data; (c) 24 bytes of a Voice-Data field containing the voice data; (d) 19 bytes of a Control-Data field containing information for controlling the voice data; (e) 1 byte of an Error-Detection field containing information for detecting an error of the voice data; and (f) 3 bytes of a PAD field for padding data used to exactly fit into the ATM cell.

6 Claims, 2 Drawing Sheets

AAL0 CELL FORMAT OF AN ATM PROTOCOL FOR COMMUNICATING VOICE TRAFFIC IN A CDMA SYSTEM

TECHNICAL FIELD

The present invention relates to an Adaptation Layer 0 (AAL0) cell format for communicating voice traffic data in a CDMA system using an Asynchronous Transfer Mode (ATM) protocol, and more particularly to an AAL0 cell format of the ATM which is configured to allow one frame of full-rate voice traffic data to be processed with only a single AAL0 cell.

BACKGROUND ART

Generally, the cell, such as an AAL2 or AAL5, of the ATM protocol used in a CDMA system consists of a 5-byte header field and a 48-byte data field (as shown in FIG. 1). It is used to communicate multimedia traffic, including voice and data traffic, through a backbone network.

An AAL5 cell of the ATM protocol contains an 8-byte trailer appended to the traffic data when converting voice traffic or data traffic signal into the cell. In a prior CDMA system, the 8-byte trailer has been widely used to communicate the traffic data because it provides an efficient process for converting the data traffic signal. However, appending the 8-byte trailer may become burdensome for the AAL5 cell when a voice signal is processed with the AAL5 cell. While each frame of half, quarter and one-eighth rate voice traffic data may be processed with one AAL5 cell, two AAL5 cells are needed to communicate the full-rate voice traffic data (i.e. a 24-byte data frame). This is because 56 bytes are required for the full-rate data (i.e., a sum of 5 (header), 24 (voice data), 19 (control data), and 8 (trailer) bytes). This may result in traffic overload. Because a base station transmission system (BTS) and a base station controller (BSC) are synchronized by means of 20 ms sync signal, the second cell of the two AAL5 cells having the fall-rate voice data may be lost (i.e., the cell may be discarded) during a communication between the BTS and BCS if the first cell comes in and then the second cell comes in after the sync signal for the first cell arrives.

Also, when a transformation between an AA5 cell and an AAL2 cell is to be made in order to communicate between the BTS and the BSC using the ATM cell, an AAL5 cell consists of 5 bytes of a header field, 24 bytes of a voice or data traffic field, a Control-Data field, 1 byte of a HEC field for error detection, and a PAD field used to pad meaningless data (as shown in FIG. 2). An AAL2 cell consists of 5 bytes of a header field, 1 byte of a START field (composed of a 6-bit Offset field, a 1-bit Sequence-Number field and 1-bit parity bit field), 48 bytes of a voice or data traffic field, and a PAD field (as shown in FIG. 3).

Therefore, when communication is performed from the BTS to the BSC through the AAL5/AAL2 cells, converting a full-rate voice traffic data into an AAL5 cell at the BSC may cause not only traffic overload, but also cell loss due to the discard by the sync signal at the BSC that attempts to decode the cell data. In addition, communication between BTS and BSC through AAL5/AAL2 produces another problem, that is, a separator is necessary to separate each voice traffic data in the process of decoding AAL2 cell data converted from many of AAL5 cells.

DISCLOSURE OF THE INVENTION

Thus, the present invention is provided in order to solve the prior problems described above. The purpose of the invention is to provide an AAL0 cell format that enables efficient voice communication in a CDMA system using ATM by allowing one frame of full-rate voice traffic data to be processed with one cell using the AAL0 protocol.

In accordance with the present invention, there is provided an ATM protocol for communicating voice data through a vocoder in a CDMA backbone network. The vocoder includes a cell-processing part, a payload-extracting part and an AAL0 cell-generating part, and an AAL0 cell format for the voice data which consists of: 5 bytes of a Header field; 1 byte of a Length field indicating the size of the voice data; 24 bytes of a Voice-Data field containing the voice data; 19 bytes of a Control-Data field containing information for controlling the voice data; 1 byte of an Error-Detection field containing information for detecting an error of the voice data; and 3 bytes of a PAD field for padding data used to exactly fit into the ATM cell.

BRIEF DESCRIPTION OF DRAWINGS

The above object and features of the present invention will become more apparent from the following description of the preferred embodiments provided in conjunction with the accompanying drawings.

BEST MODE FOR CARRYING OUT THE INVENTION

In accordance with an embodiment of the present invention, an AAL0 cell format for communicating fall-rate voice traffic data in a CDMA system using an ATM protocol is described in detail in the following description with reference to the appended figures.

Figure 5:
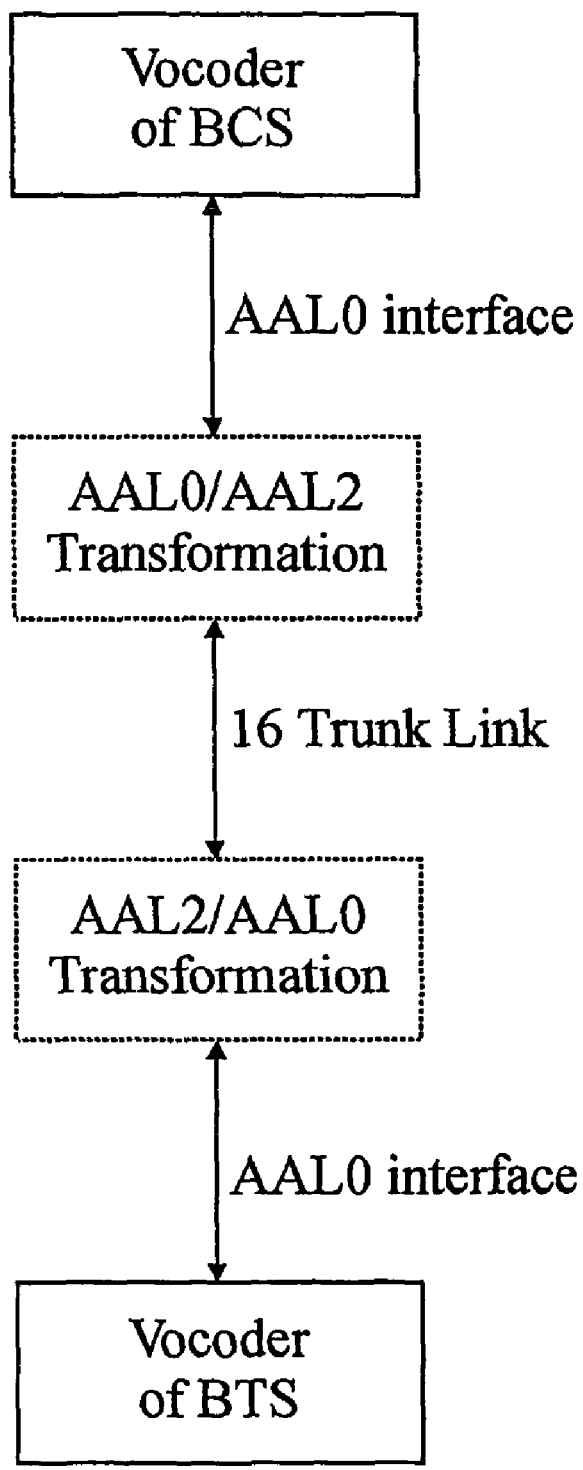
FIG. 5 schematically represents a process for communicating voice data between a BTS and a BSC using the AAL0/AAL2 cells, which are shown respectively in FIG. 4 and FIG. 3, in a CDMA system using the ATM protocol.

FIG. 5 is a block diagram of a device for implementing an AAL0 cell format for communicating full-rate voice traffic data in a CDMA system using an ATM protocol, wherein the device comprises a vocoder 100.

The vocoder 100 generates 5 bytes of a Cell Header field 10, 1 byte of a Length field 20 indicating the size of the voice data, 24 bytes of a Voice-Data field 30 containing the full-rate voice data, 19 bytes of a Control-Data field 40 containing an information for controlling the full-rate voice data, 1 byte of an Error-Detection field 50 containing an information for detecting an error of the voice data, and 3 bytes of a PAD field 60 for padding data used to exactly fit into the ATM cell. The vocoder 100 consists of a cell-processing part, a payload-extracting part and an AAL0 cell-generating part.

Figure 1:
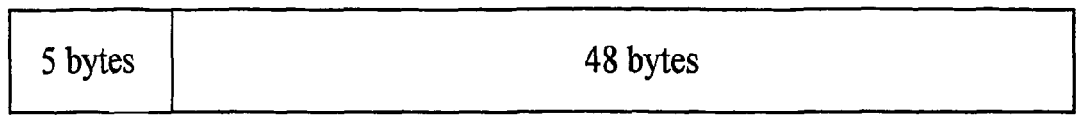
FIG. 1 shows an ATM cell format.
Figure 2:
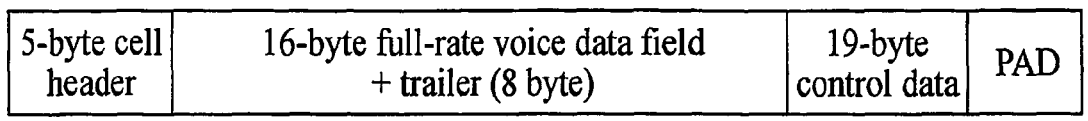
FIG. 2 shows an AAL5 cell format of the ATM cell.
Figure 3:
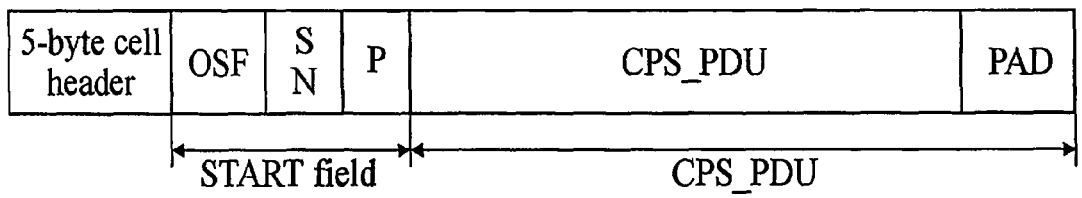
FIG. 3 shows an AAL2 cell format of the ATM cell.
Figure 4:
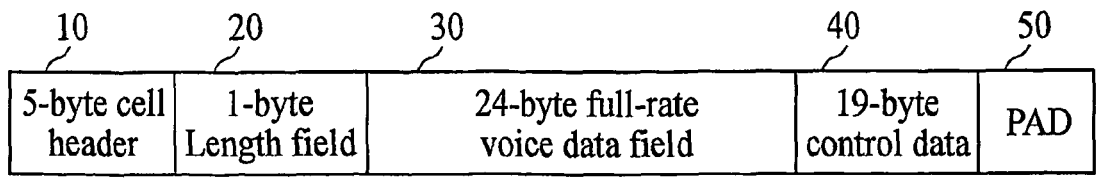
FIG. 4 shows an AAL0 cell format used to communicate voice data in a CDMA system using the ATM protocol according to one embodiment of the present invention.

According to an embodiment of the present invention, an AAL0 cell format for communicating the full-rate voice traffic data in a CDMA system using an ATM protocol is described with reference to FIG. 4 and FIG. 5.

After receiving the fall-rate voice data, the vocoder 100 generates 5 bytes of a Cell Header field 10 and 1 byte of a Length field 20 indicating the size of the voice data based on the size of the full-rate voice data. Also, the vocoder 100 generates 24 bytes of a Voice-Data field 30 containing the full-rate voice data corresponding to the length field and 19 bytes of a Control-Data field 40 in the next region. Further, the vocoder 100 generates 1 byte of an Error-Detection field 50 for determining the error of the AAL0 cell, 3 bytes of a PAD field 60 to exactly fit into the ATM cell, and finally sends the above data to the BTS.

Thereafter, the full-rate voice data is converted to an AAL0 cell, which is generated by the vocoder 100 in the BTS. Then, in the BTS, the AAL0 cell is converted to AAL2 and sent to the BSC. Finally, the vocoder 100 of the BSC performs communication by converting to AAL0 cell the AAL2 cell, which is transmitted from the BTC.

INDUSTRIAL APPLICABILITY

As the above describes, by using the AAL0 cell format for communicating fall-rate voice traffic data in a CDMA system using an ATM protocol, it becomes possible to increase the efficiency of a trunk by reducing the size of the full-rate voice signal to one cell.

Reducing the load of a processor, correcting the error of synchronization time (errors can occur when using two cells for transmitting data), resolving cell loss and increasing the efficiency of the trunk produces the advantage of being able to transmit signals of several subscribers through one AAL0/2 cell.

In a situation where two AAL5 cells of the first user and another two AAL5 cells of the second user are converted to one AAL2 cell in order to process large data, a separator is conventionally required for separating the first user's cells and the second user's cells from the data in the conversion of the AAL5/AAL2 cells. However, another benefit of the present invention is that the conversion of AAL0/AAL2 cells doesn't require such a separator because the cell frame of the data is divided according to the user.

The invention claimed is:

1. A device configured to communicate voice data under an ATM protocol, the device comprising:
   a communication interface configured to receive a full-rate voice data signal, wherein the full-rate voice data signal comprises one or more frames, wherein each frame includes a segment of full-rate voice data, wherein the segment of full-rate voice data included in said each frame is 24 bytes;
   an ATM Adaptation Layer 0 (AAL0) cell-generation system configured to generate an AAL0 cell that corresponds to each of the one or more frames, wherein each AAL0 cell comprises:
      a header field, wherein the header field is 5 bytes;
      a data field comprising the segment of full-rate voice data included in the frame, wherein the data field in said each AAL0 cell is 24 bytes;
      a PAD field for padding the AAL0 cell such that the size of the AAL0 cell is in accordance with the ATM protocol, wherein the PAD field is 3 bytes;
      a 1-byte length field containing information for indicating a size of the segment of full-rate voice data included in the frame;
      a 19-byte control-data field containing information for controlling the full-rate voice data signal; and
      a 1-byte error-detection field containing information usable to detect one or more data errors in said full-rate voice data; and
   a cell-processing system configured to generate an ATM Adaptation Layer 2 (AAL2) cell corresponding to each generated AAL0 cell, wherein each AAL2 cell comprises a data field that includes the segment of full-rate voice data from the AAL0 cell from which the AAL2 cell was generated, and wherein the device is further configured to send the AAL2 cells to a base station controller (BSC) in a CDMA network;
   wherein the device is a base transceiver station (BTS) in the CDMA network.

2. The device of claim 1, wherein each frame comprises a payload that includes the segment of full-rate voice data included in the frame, the device further comprising:
   a payload-extraction system configured to extract the payload from each frame and provide the payload to the AAL0 cell-generation system.

3. The device of claim 1, wherein the device is further configured to receive one or more ATM Adaptation Layer 2 (AAL2) cells, wherein each AAL2 cell comprises a data field that includes a segment of full-rate voice data;
   the device further comprising a payload-extraction system configured to extract the segment of full-rate voice data from each AAL2 cell and provide a payload from the segment to the AAL0 cell-generation system.

4. A device configured to communicate voice data under an ATM protocol, the device comprising:
   a communication interface configured to receive one or more ATM Adaptation Layer 2 (AAL2) cells, wherein each AAL2 cell comprises a data field that includes a segment of full-rate voice data, wherein the segment of full-rate voice data is 24 bytes, and wherein the AAL2 cells are received from a base transceiver station (BTS) in a CDMA network that generates each AAL2 cell from a corresponding ATM Adaptation Layer 0 (AAL0) cell; and
   an AAL0 cell-generation system configured to generate an AAL0 cell that corresponds to each of the one or more received AAL2 cells, wherein each AAL0 cell comprises:
      a header field, wherein the header field is 5 bytes;
      a data field comprising the segment of full-rate voice data included in the AAL2 cell;
      a PAD field for padding the AAL0 cell such that the size of the AAL0 cell is in accordance with the ATM protocol, wherein the PAD field is 3 bytes;
      a 1-byte length field containing information for indicating a size of the segment of full-rate voice data included in the AAL2 cell;
      a 19-byte control-data field containing information for controlling said full-rate voice data; and
      a 1-byte error-detection field containing information usable to detect one or more data errors in said full-rate voice data;
   wherein the device is a base station controller (BSC) in the CDMA network.

5. The device of claim 4 wherein the data field in said each AAL0 cell is 24 bytes.

6. A method for communicating voice data under an ATM protocol, the method comprising:
   receiving a full-rate voice data signal, wherein the full-rate voice data signal comprises one or more frames, wherein each frame includes a segment of full-rate voice data, wherein the segment of full-rate voice data included in said each frame is 24 bytes;
   generating an ATM Adaptation Layer 0 (AAL0) cell corresponding to each of the one or more frames, wherein each AAL0 cell comprises:
      a header field, wherein the header field is 5 bytes;
      a data field comprising the segment of full-rate voice data included in the frame, wherein the data field in each generated AAL0 cell is 24 bytes;

a PAD field for padding the AAL0 cell such that the size of the AAL0 cell is in accordance with the ATM protocol, wherein the PAD field is 3 bytes;

a 1-byte length field indicating a size of the segment of full-rate voice data included in the frame;

a 19-byte control-data field containing information for controlling full-rate traffic data; and a 1-byte error-detection field containing information usable to detect one or more data errors in said full-rate voice data;

generating an ATM Adaptation Layer 2 (AAL2) cell corresponding to each generated AAL0 cell, wherein each AAL2 cell comprises a data field that includes the segment of full-rate voice data from the AAL0 cell from which the AAL2 cell was generated; and sending the AAL2 cells to a base station controller (BSC) in a CDMA network;

wherein the method is carried out at a base transceiver station (BTS) in the CDMA network.

* * * * *